United States Patent
Chen et al.

(10) Patent No.: US 10,332,266 B2
(45) Date of Patent: Jun. 25, 2019

(54) METHOD AND DEVICE FOR TRAFFIC SIGN RECOGNITION

(71) Applicant: AGENCY FOR SCIENCE, TECHNOLOGY AND RESEARCH, Singapore (SG)

(72) Inventors: Tao Chen, Singapore (SG); Shijian Lu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 91 days.

(21) Appl. No.: 15/527,833

(22) PCT Filed: Nov. 18, 2015

(86) PCT No.: PCT/SG2015/050458
§ 371 (c)(1),
(2) Date: May 18, 2017

(87) PCT Pub. No.: WO2016/080913
PCT Pub. Date: May 26, 2016

(65) Prior Publication Data
US 2017/0323452 A1    Nov. 9, 2017

(30) Foreign Application Priority Data
Nov. 18, 2014   (SG) .............................. 10201407715T

(51) Int. Cl.
*G06K 9/00*     (2006.01)
*G06T 7/246*    (2017.01)
(Continued)

(52) U.S. Cl.
CPC ............ *G06T 7/246* (2017.01); *G06F 16/434* (2019.01); *G06F 17/18* (2013.01); *G06K 9/00818* (2013.01)

(58) Field of Classification Search
CPC .... G06K 9/00818; G06K 9/6256; G06K 9/66; G06K 9/4642; G06K 9/6267;
(Continued)

(56) References Cited

U.S. PATENT DOCUMENTS 9,471,977 B2 * 10/2016 Ozaki ................... G02B 21/244
9,779,314 B1 * 10/2017 Wendel .............. G06K 9/00825
(Continued)

OTHER PUBLICATIONS

Dardas, Nasser H., and Nicolas D. Georganas. "Real-time hand gesture detection and recognition using bag-of-features and support vector machine techniques." IEEE Transactions on Instrumentation and measurement 60.11 (2011): 3592-3607.*
(Continued)

*Primary Examiner* — Li Liu
(74) *Attorney, Agent, or Firm* — K. David Crockett, Esq.; Niky Economy Syrengelas, Esq.; Crockett & Crockett, PC

(57) ABSTRACT

Embodiments provide a method for recognizing a traffic sign from an input image. The method may include extracting image features from the input image; modifying the image features based on a predetermined image saliency map to determine modified image features; determining a plurality of traffic sign candidates by applying an adaptive boosting algorithm on the modified image features; determining a confidence score for each traffic sign candidate by applying a support vector regression algorithm; and recognizing a traffic sign based on the confidence score for each traffic sign candidate.

20 Claims, 6 Drawing Sheets

(51) Int. Cl.
*G06F 16/432* (2019.01)
*G06F 17/18* (2006.01)
(58) Field of Classification Search
CPC .......... G06K 9/00624; G06K 9/00825; G06K 9/3233; G06T 2207/20081
See application file for complete search history.

(56) References Cited

U.S. PATENT DOCUMENTS

| | | | |
|---|---|---|---|
| 2006/0034484 A1* | 2/2006 | Bahlmann | G06K 9/00818 382/103 |
| 2009/0067730 A1* | 3/2009 | Schneiderman | G06K 9/00241 382/224 |
| 2009/0245626 A1* | 10/2009 | Norimatsu | G06K 9/3233 382/164 |
| 2011/0109476 A1* | 5/2011 | Porikli | G06K 9/00818 340/905 |
| 2011/0249867 A1* | 10/2011 | Haas | G06K 9/00818 382/103 |
| 2013/0251206 A1* | 9/2013 | Ishikawa | G06K 9/00624 382/103 |
| 2014/0063232 A1* | 3/2014 | Fairfield | G06K 9/78 348/118 |
| 2014/0294291 A1* | 10/2014 | Zhang | G06K 9/00818 382/159 |
| 2015/0063688 A1* | 3/2015 | Bhardwaj | G06K 9/18 382/159 |
| 2015/0117784 A1* | 4/2015 | Lin | G06K 9/4671 382/195 |
| 2015/0193663 A1* | 7/2015 | Oh | G06K 9/00818 382/104 |
| 2015/0206018 A1* | 7/2015 | Cho | G06K 9/00818 382/161 |
| 2015/0220796 A1* | 8/2015 | Yokoi | B60R 1/00 348/148 |
| 2016/0140424 A1* | 5/2016 | Wang | G06K 9/66 382/156 |

OTHER PUBLICATIONS

Woo, Jeong-Woo, Wono Lee, and Minho Lee. "A traffic surveillance system using dynamic saliency map and svm boosting." International Journal of Control, Automation and Systems 8.5 (2010): 948-956.*

Yang, Jun, et al. "Evaluating bag-of-visual-words representations in scene classification." Proceedings of the international workshop on Workshop on multimedia information retrieval. ACM, 2007.*

* cited by examiner

METHOD AND DEVICE FOR TRAFFIC SIGN RECOGNITION

CROSS-REFERENCE TO RELATED APPLICATIONS

The present application claims the benefit of the Singapore patent application No. 10201407715T filed on 18 Nov. 2014, the entire contents of which are incorporated herein by reference for all purposes.

TECHNICAL FIELD

Embodiments relate generally to object recognition, and in particular, relate to a method and a device for traffic sign recognition.

BACKGROUND

With the popularity of different types of sensors embedded in vehicles, traffic sign recognition (TSR) has been receiving more and more interest in recent years. TSR provides semantic information of different traffic signs, such as "STOP" and "Slow Down", which are essentially important for the assistive or autonomous driving of a vehicle.

Current traffic sign detection systems have achieved much progress through improving either the Viola-Jones approach or Histogram of Gradients (HoG) based approach. Further, most techniques use the binary support vector machine (SVM) to train the perfect samples (also referred to as ground truth rectangles in the image) into a detector to learn an optimal hyperplane to separate the positive and negative traffic sign samples.

There is a need to improve the accuracy for traffic sign detection and recognition. There is also a need to improve the speed of traffic sign detection and recognition for real-time applications.

SUMMARY

Various embodiments provide a method for recognizing a traffic sign from an input image. The method may include extracting image features from the input image; modifying the image features based on a predetermined image saliency map to determine modified image features; determining a plurality of traffic sign candidates by applying an adaptive boosting algorithm on the modified image features; determining a confidence score for each traffic sign candidate by applying a support vector regression algorithm; and recognizing a traffic sign based on the confidence score for each traffic sign candidate.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
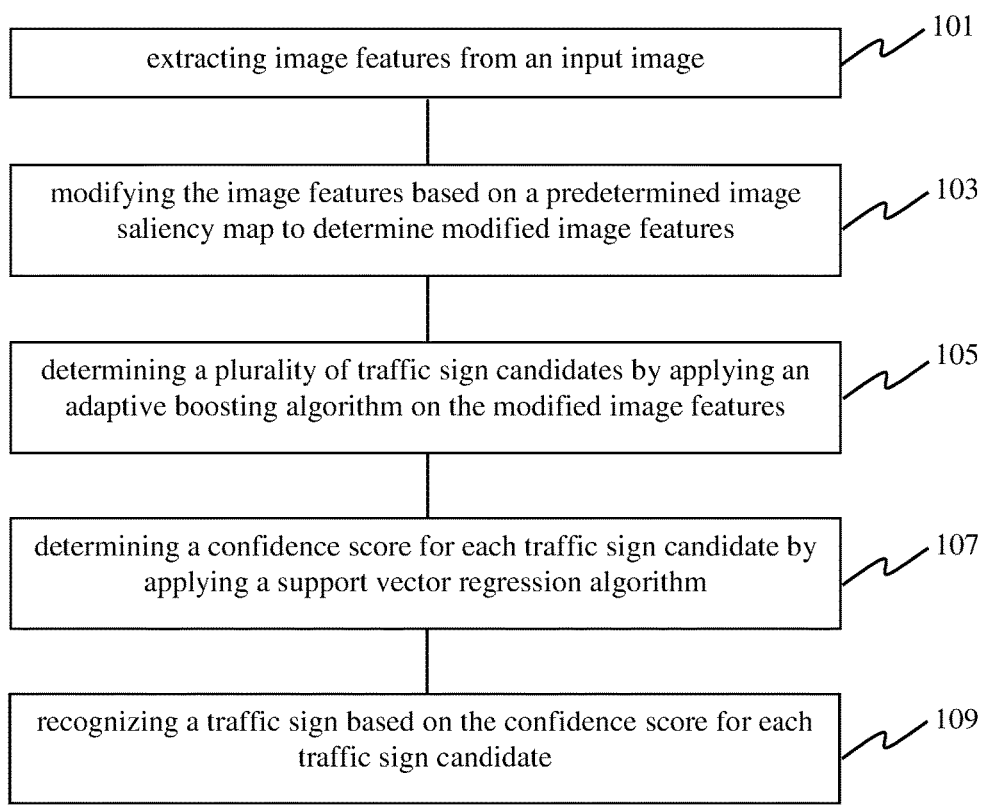
FIG. 1 shows a flowchart illustrating a method for recognizing a traffic sign from an input image according to various embodiments.

In the current approaches for traffic sign detection, traffic signs' saliency information is ignored when calculating the image channel features for adaptive boosting (Adaboost) based detection. It is realized in this description that due to the obvious color and shape difference of a traffic sign against its surrounding environment, the traffic sign pixels in an image usually have high saliency, which may be exploited for better traffic sign detection.

In addition, the current approaches use the binary support vector machine (SVM) to train the ground truth rectangles only in the image into a detector. In various embodiments, samples that are generated by Adaboost detection and regions randomly sampled around the ground truth are considered for the training process. These samples usually have partial or no overlap with the ground truth and present different importance for training. For example, the training samples that have larger intersection ratios with their ground truth signs are more important and are given higher scores for detector training, while the samples that have lower intersection ratios with their ground truth signs are less important and are given lower scores for detector training. In various embodiments, a support vector regression (SVR) algorithm which considers both ground truth and generated training samples and meanwhile allows these samples to have different weights is more suitable for the traffic sign detection and recognition. Different from SVM that learns an optimal hyperplane to separate the positive and negative samples, the SVR aims to learn an optimal regression model to correlate the training samples with their weights.

Various embodiments provide a method and a device for traffic sign recognition in a more accurate manner.

Embodiments described below in context of the traffic sign recognition method are analogously valid for the respective devices for implementing the traffic sign recognition method, and vice versa.

In this context, the traffic sign recognition device as described in this description may include a memory which is for example used in the processing carried out in this device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In this context, the traffic sign recognition device as described in this description may be or may include one or more circuits configured to perform the respective processing, respectively.

In an embodiment, a "circuit" may be understood as any kind of a logic implementing entity, which may be a special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

FIG. 1 shows a flowchart 100 illustrating a method for recognizing a traffic sign from an input image according to various embodiments.

At 101, image features are extracted from the input image.

At 103, the image features are modified based on a predetermined image saliency map to determine modified image features.

At 105, a plurality of traffic sign candidates are determined by applying an adaptive boosting (Adaboost) algorithm on the modified image features.

At 107, a confidence score for each traffic sign candidate is determined by applying a support vector regression (SVR) algorithm.

At 109, a traffic sign is recognized based on the confidence score for each traffic sign candidate.

In various embodiments, the image features may include at least one of color, gradient, orientation or shape features. The color features may be selected from RGB, HSV, HSI, CMYK, LUV, or any other suitable color channel features. The gradient feature may be represented by a normalized gradient magnitude at each pixel, for example, used to measure the edge strength. The orientation features may be represented by histograms of oriented gradients, which is a weighted histogram wherein bin index is determined by gradient orientation and weighted by gradient magnitude. The shape features may include haar wavelet features and histogram of oriented gradients features, or a combined of both.

In various embodiments, the predetermined image saliency map is determined based on at least one of color saliency or spatial location information of traffic signs. The color saliency may be determined dependent on categories of traffic signs. For example, different categories of traffic signs may have different dominant color. The spatial location information, e.g., prior information of a traffic sign's position in an image, may be used to provide a location saliency. The color saliency and the location saliency may be combined, e.g. through a multiplication operation, to determine a saliency value for each pixel.

In various embodiments, the adaptive boosting algorithm includes a traffic sign training process using training images to learn a set of decision trees. The training images may include traffic sign images and non-traffic sign images.

In various embodiments, the adaptive boosting algorithm may include applying the set of decision trees on the modified image features of the input image to determine the plurality of traffic sign candidates. In various embodiments, the traffic sign candidates refer to candidate regions or rectangles in which a traffic sign may exist.

In various embodiments, the determination of the confidence score for each traffic sign candidate may include quantizing each traffic sign candidate into a bag-of-words histogram using a predefined codebook; and applying the support vector regression algorithm on the bag-of-words histogram to determine the confidence score for each traffic sign candidate.

In various embodiments, the support vector regression algorithm is trained using training samples. The training samples may include traffic sign training candidates determined by applying the adaptive boosting algorithm to training images, and may further include non-traffic sign regions randomly sampled from the training images. In various embodiments, the non-traffic sign regions may be generated by randomly sampling around true traffic sign regions.

In various embodiments, the support vector regression algorithm is trained based on a similarity coefficient of each training sample. The similarity coefficient represents an intersection ratio between each training sample and a corresponding true traffic sign.

In various embodiments, if the confidence score determined by the SVR algorithm for the traffic sign candidate is higher than a predetermined score, it is recognized that the traffic sign is present in the traffic sign candidate.

In various embodiments, it is recognized that the traffic sign of a predetermined category is present in the traffic sign candidate, if the confidence score determined by the SVR algorithm for the traffic sign candidate matches a score corresponding to the predetermined category. In various embodiments, a plurality of scores may be pre-calculated or predetermined such that the plurality of scores corresponds to a plurality of categories of traffic signs, respectively. The plurality of categories may include work ahead/in progress category, stop/go category, or other pre-defined sign categories, for example. In other embodiments, the plurality of categories may include prohibitory and danger category, mandatory category, etc. The confidence score determined for each traffic sign candidate may be compared with the pre-calculated scores corresponding to the plurality of categories to determine the category of traffic sign in the traffic sign candidate, such that the detected traffic sign may be classified into one of the plurality of categories.

Various embodiments of the traffic sign recognition method are described in more detail below with respect to FIG. 2 and FIG. 3.

Figure 2:
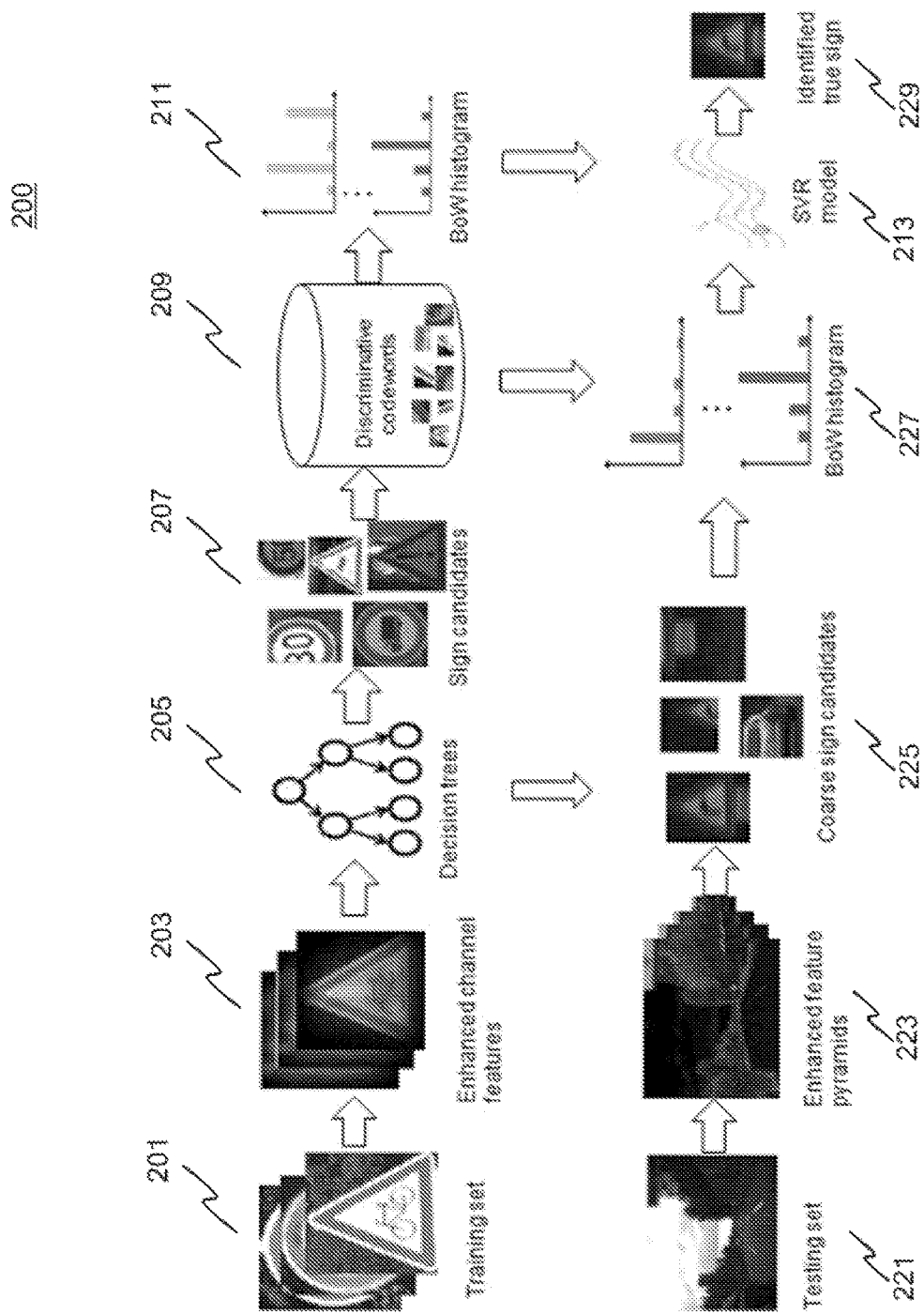
FIG. 2 shows a framework for accurate and efficient traffic sign recognition according to various embodiments.

FIG. 2 shows a framework 200 for traffic sign recognition according to various embodiments.

As shown in FIG. 2, the traffic sign detection framework 200 includes an offline training stage using training images 201 and an online testing stage using testing images 221. The testing image may be the input image described in the embodiments of FIG. 1 above.

During offline training stage, visual saliency is computed for training images and is incorporated into the true traffic signs (also referred to as ground truth signs) through multiplication operation. The image features are extracted in various channels including at least one of color, gradient and Orientation, and are modified by visual saliency to form modified features 203 (also referred to as enhanced channel features). The enhanced channel features 203 are concatenated into a single vector to represent a sign image. These vectors representing the training images are then trained into a set of decision trees 205 through the Adaboost algorithm. A set of traffic sign candidates 207 are produced by applying the learned decision trees 205 on the training images. These sign candidates 207 together with non-sign candidates randomly sampled from the training images are assigned different weights according to their intersection ratios with the ground truth signs, and a bag-of-words (BoW) histogram 211 is generated to represent each traffic sign candidate. Finally a SVR model 213 is learned to correlate these candidates' weights and their BoW histograms. During this process, a discriminative codebook 209 is learned by filtering out those unimportant words and keeping only those important ones for sign candidate representation.

During the online testing stage, the feature pyramids of a testing image 221 are obtained by down sampling the testing image into lower resolutions. The image saliency is computed and integrated with each pyramid level to generate the enhanced feature pyramids 223. The decision trees 205 learned in the offline stage are then used as the sliding window input on these feature pyramids 223 to produce a set of traffic sign candidates 225. The traffic sign candidates 225 are coarse sign candidates which may include true positives and false positives. Each candidate is then quantized into a BoW histogram 227 using selected code-words from the codebook 209, and further forwarded to the learned SVR model 213 for determining a confidence score. The traffic sign candidates with scores higher than a predetermined threshold are recognized and identified as the true traffic signs 229. In various embodiments, if the confidence score for the traffic sign candidate matches a predetermined score range of the predetermined category, the traffic sign candidate is recognized and identified as a true traffic signs 229 of the predetermined category.

The traffic sign recognition method of FIG. 2 is described in more detail below.

In the traffic sign detection stage, traffic sign candidates, in other words, candidate regions or rectangles in which traffic sign is located, may be detected or determined using the Adaboost algorithm. First, an image pyramid is obtained by re-sampling the original image 201, 221 into different resolutions. A saliency map is calculated at each pyramid level and the saliency value of each image pixel is integrated with the original image to obtain an enhanced image feature pyramid 203, 223. In various embodiments, the image features may include at least one of color, gradient, orientation or shape features. In an embodiment, 10 different image channels, for example, LUV color space channel, 1 gradient magnitude channel and 6 orientation channels, are computed for image feature extraction. The pixel summations in each channel image block at different pyramid levels are computed and concatenated into a feature vector to represent the image. The Adaboot algorithm is used to learn decision trees 205 over these enhanced image features to generate a set of traffic sign candidates (or rectangles) 207, 225.

During this process, the saliency map that assigns higher weights to the sign pixels, while lower weights to the non-sign pixels is determined. At least one of two factors may be considered for saliency map computation: one is based on the visual image feature (e.g. color saliency), and the other is based on the prior information of a traffic sign's position in an image. For the first factor, an improved Itti-Koch method is performed to determine color saliency, in which the color saliency values are determined according to the specified traffic sign categories. By way of example, when calculating the color saliency for prohibitory and danger categories of signs, the red color opponency against other colors is emphasized. When calculating the color saliency for mandatory category of signs, the blue color opponency against other colors is emphasized. This may be similarly applied to other categories of signs by replacing the red color or blue color with the dominant colors for that category. For the second factor, it is found that a traffic sign's position is usually located in the middle area of an image, and less likely in the bottom or both sides of an image. Accordingly, a Gaussian mixture model (GMM) is learned to approximate the distribution of these signs' positions in the images, and then a likelihood score is estimated given a new sign position.

In various embodiments, one of the two saliency values based on visual feature and spatial location information may be used alone to form the saliency map. In various embodiments, the two saliency values based on visual feature and spatial location information may be combined, for example, through a multiplication operation, to give a final saliency value for each pixel in the image. This saliency value may be multiplied with the original image at different pyramid levels to generate the enhanced image pyramid 203, 223.

The boosted decision trees 205 determined by the Adaboost algorithm may be used as the sliding window input over the enhanced image pyramid, to generate a set of traffic sign candidate rectangles. The traffic sign candidates are coarse sign candidates, which may include both true positives and false positives. A SVR approach is then carried out in the second stage to prune out the false positives and keep the true positives.

In various embodiments, the SVR model 213 based on bags-of-words (BoW) image representation is adopted to identify the true traffic signs from the detected sign candidates. A set of training samples are first generated, and meanwhile the Jaccard similarity coefficient reflecting the intersection ratio between the training sample and corresponding ground truth rectangles is computed as its soft score. The training samples may be generated from two sources: one is using the detected sign candidates by applying the learned decision trees 205 on the training images 201, and another is using the randomly generated rectangle boxes through translating and rotating the ground truth rectangles along both horizontal and vertical directions. The randomly generated rectangle boxes may be non-traffic sign regions randomly sampled from the training images. An original codebook 209 is then generated by performing k-means clustering algorithm on a set of local features extracted from the training samples. The codebook quantizes each traffic sign candidate into a BoW histogram 211 by matching the extracted local features from the image with the codebook 209, which is then compressed using the selected code-words. The SVR model 213 is finally learned using these compressed BoW histograms coupled with their soft scores.

To learn the discriminative code-words for the sign candidate image representation, both mean square error and correlation coefficient between the actual and SVR predicted scores for training samples are considered for optimized code-word selection. For initialization, the code-word that generates the minimum SVR prediction loss is selected as the new codebook. Then the method starts searching from the very first code-word and randomly selects one to form the new codebook during the following stage. If the SVR model learned using the new codebook produces less prediction loss, the new codebook will be saved and meanwhile another loop of code-word search is started. This process repeats until the last code-word in the original codebook has been traversed and the SVR prediction loss no longer changes. This ensures that each code-word can have a chance to be selected into the new codebook.

Finally, after generating an optimal discriminative codebook 209, each training sample may be encoded into a compressed BoW histogram 211, and these compressed histograms 211 are then used to learn the final SVR model 213, which is used to determine a confidence score for each traffic sign candidate in the testing stage to prune the false positives and keep only those true positives. This approach helps to increase the detection precision greatly but has little effects on the detection recall.

Figure 3:
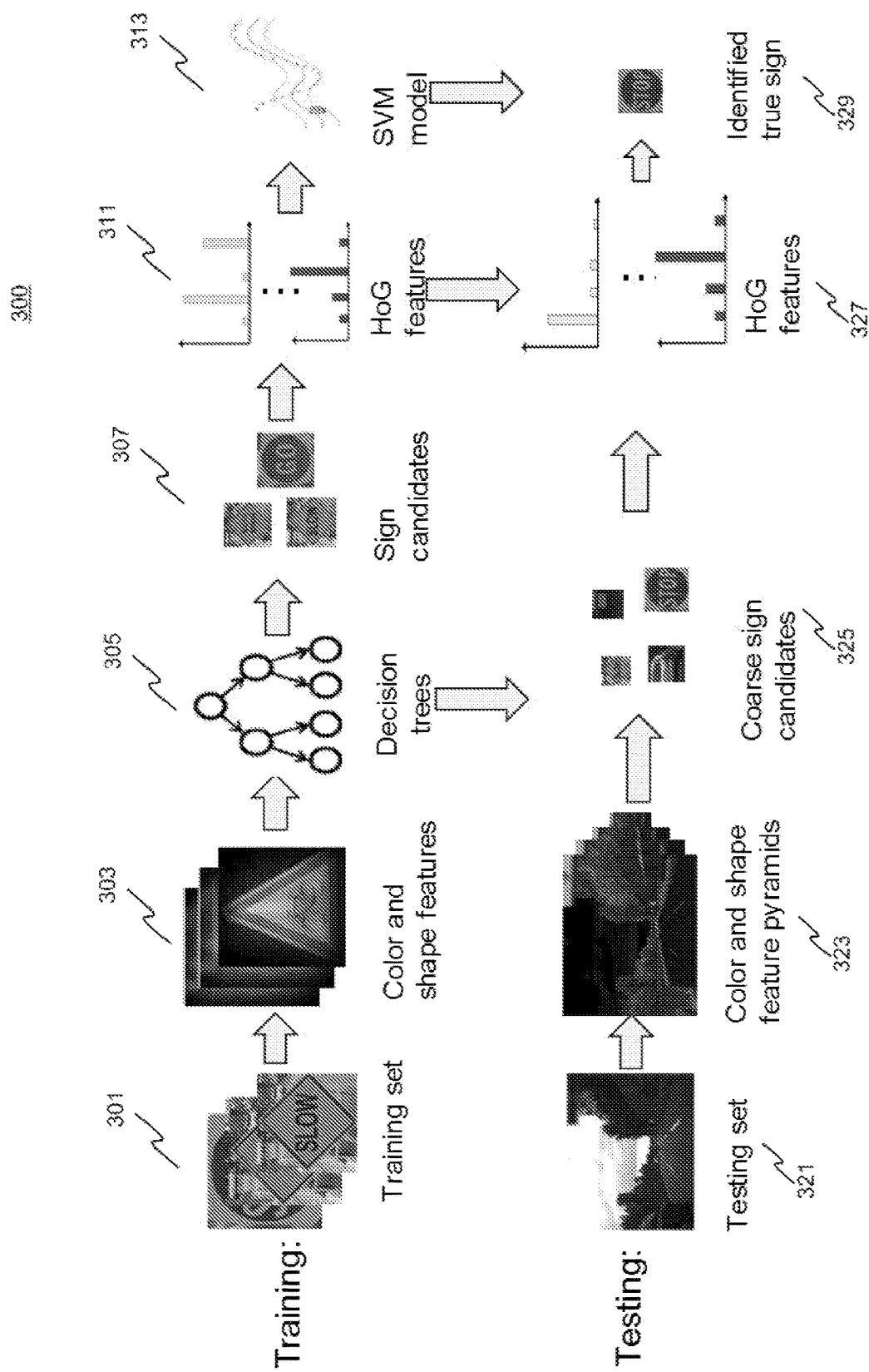
FIG. 3 shows a specific framework for real-time traffic sign recognition according to various embodiments.

FIG. 3 shows a framework 300 for traffic sign recognition according to various embodiments.

The traffic sign recognition method according to various embodiments may be a real-time traffic sign recognition approach including two stages: traffic sign detection and traffic sign classification (or recognition) from input images (e.g. video frames). The detection step localizes all the traffic signs in the current video frame, and the recognition step then classifies each detected sign into a category: work ahead/in progress, stop/go, or other pre-defined sign categories, for example.

As shown in FIG. 3, an overview of the real-time traffic sign recognition method is provided. In the embodiments of FIG. 3, a color and shape fusion based traffic sign recognition approach is provided. In the offline training stage, the HSV color space and shape features 303 are extracted from each traffic sign training image 301. Adaboost is then used to train these features 303 into a set of decision trees 305 for traffic sign candidate detection, and the traffic sign candidates 307 of the training images 301 are thus determined using Adaboost. In the recognition step, the histogram of gradients (HoG) 311 are extracted and encoded into a BoW histogram to represent each traffic sign candidate 307. A support vector machine (SVM) 313 is then learned and used to recognize true traffic signs 329 from the detected traffic sign candidates 307.

In the online testing stage, the color and shape features 323 are extracted from each traffic sign input image from a testing set 321. The set of decision trees 305 determined in the Adaboost training stage are applied on the color and shape features 323 to determine coarse traffic sign candidates 325 of the input images from the testing set 321. In the recognition step, the histogram of gradients (HoG) 327 are extracted and encoded into a BoW histogram to represent each traffic sign candidate 325. The learned SVM model 313 is used to recognize true traffic signs 329 from the traffic sign candidates 325 detected from the input image of the testing set 321. In various embodiments, a learned SVR model, for example, the SVR model 213 of FIG. 2, may also be used to recognize and classify true traffic signs 329 from the detected traffic sign candidates 325 into one of predetermined categories.

Various embodiments provide a device for recognizing a traffic sign from an input image, according to the method described in various embodiments of FIGS. 1-3 above. The traffic sign recognition device may include an image feature extracting circuit for extracting image features from the input image; an image feature modifying circuit for modifying the image features based on a predetermined image saliency map to determine modified image features; a traffic sign candidate determining circuit for determining a plurality of traffic sign candidates by applying an adaptive boosting algorithm on the modified image features; a confidence score determining circuit for determining a confidence score for each traffic sign candidate by applying a support vector regression algorithm; and a traffic sign recognizing circuit for recognizing a traffic sign based on the confidence score for each traffic sign candidate.

Various embodiments of the traffic sign recognition method are analogously valid for the traffic sign recognition device, and vice versa.

In various embodiments, to achieve more accurate traffic sign recognition, color saliency, a shape based cascade classifier and a sign re-identification step may be used to increase the recognition accuracy.

The traffic signs often appear in red, blue, green or yellow colors which are distinct from its surroundings. Accordingly, color information is used to estimate the saliency value at each pixel. Morphological operations, such as dilation or erosions, may be performed in the sign image. This is because some signs may be occluded by clutters, may have uneven/poor lightings, or may be too close to other objects with similar shapes, which will cause the sign to be truncated into several parts or fused with other objects and becomes challenging to be detected. After morphological operations, the color saliency values corresponding to a specific category of sign (e.g., red, blue, or green) are determined and filtered to generate the saliency map, for example, to generate the saliency map as described in paragraph [0037] above. Those image areas with high saliency scores indicate possible sign area and their contours are then extracted as traffic sign candidates. The color saliency values may be used to modify the color features 303, 323 to achieve modified and enhanced features, which are used in the Adaboost detection and SVM/SVR recognition for better accuracy.

In various embodiments, color saliency may only give a rough estimate of the sign position. The prior knowledge, such as sign size, aspect ratio, may be used to filter out some false positives from the candidates. To further improve the detection accuracy, a shape based cascade classifier is used to give an accurate estimate of the sign's position. The combination of both haar wavelet features and HoG gradients are used to encode each training image. These features are first forwarded to the first stage of Adaboost training, and produce a classifier. The classifier is again used to generate a set of new positive and negative samples from training images, for the next stage of Adaboost training. In each stage, only those highly scored hard negative samples are selected for the next stage of training. This can enhance the discriminative capability of the trained classifier.

For the Adaboost detected sign candidates, a sign re-identification step is performed to verify and classify the traffic sign. For each detected sign candidate, the dense HoG features are computed and then quantized into a histogram via BoW algorithm. To learn a discriminative codebook for feature quantization, an iterative feature search algorithm as described in paragraph [0041] above is used to iteratively select a discriminative feature in each iteration, which is then combined with previous selected features to represent a sign candidate. The representation is forwarded to a SVR model for the first stage of scoring. If the score is higher than before, the feature is selected otherwise it is abandoned. The one-vs-all strategy is used to train a multi-class SVM or SVR for sign classification. Based on the SVR scores, it can be determined whether to keep or reject the sign. This further serves as a sign re-identification step.

Figure 4:
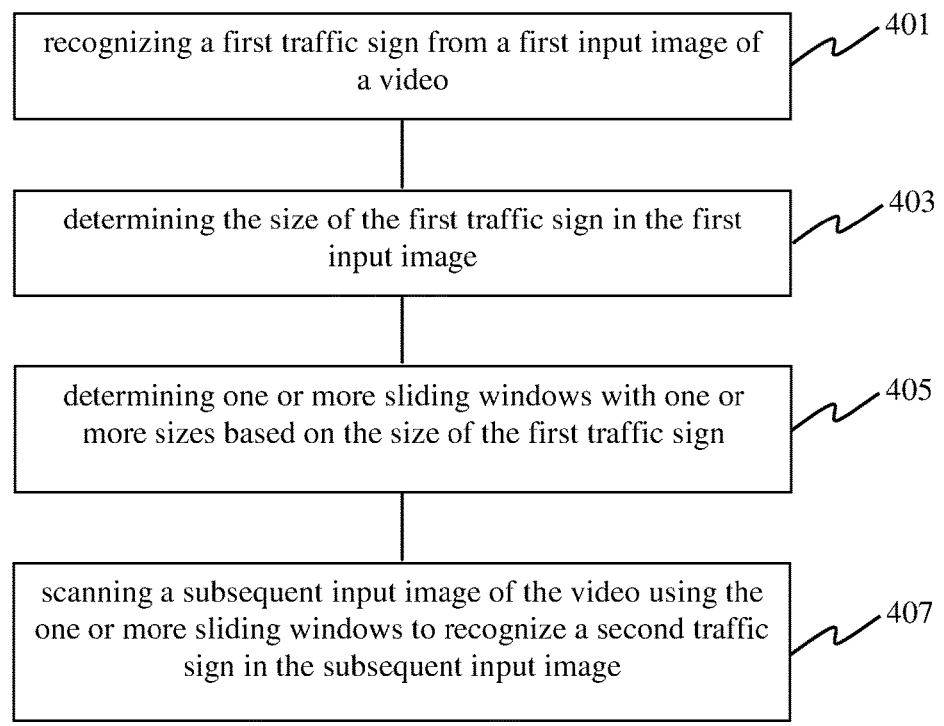
FIG. 4 shows a flowchart illustrating a method for recognizing a traffic sign from a video according to various embodiments.

FIG. 4 shows a flowchart 400 illustrating a method for recognizing a traffic sign from a video having a sequence of input images according to various embodiments.

At 401, a first traffic sign is recognized from a first input image of the video, for example, from a random search window in the first input image according to the method described in FIGS. 1 to 3 of various embodiments above.

At 403, the size of the first traffic sign in the first input image is determined. The size of the first traffic sign may be referred to as a first size.

At 405, one or more sliding windows with one or more sizes are determined based on the size of the first traffic size. In various embodiments, the one or more sizes may be in a range from the first size to a second size larger than the first size. In various embodiments, the number of sliding windows may be small. For example, the number of sliding windows may be one, or two, or three, or any suitable number. In various embodiments, the second size may be n times of the first size, wherein n may be 1.25, 1.5, 2, 2.25, 2.5, etc.

At 407, a subsequent input image of the video is scanned using the one or more sliding windows to recognize a second traffic sign in the subsequent input image.

In various embodiments, the position of the first detected traffic sign in the first input image may be determined. A search window for the subsequent input image may be determined having a position substantially similar to the position of the first traffic sign. The subsequent input image may be scanned using the one or more sliding windows in the search window to recognize whether the second traffic sign is present in the subsequent input image.

In various embodiments, if no traffic sign is recognized from the first input image, a search window is randomly generated with a position different from a position of the previous search window used for the first input image. The subsequent input image of the video is scanned in the randomly generated search window to recognize whether the second traffic sign is present in the subsequent input image.

The same process above may be performed for the next subsequent input image until all images in the video have been scanned and processed.

The various embodiments of FIG. 4 provide a method to speed up traffic sign recognition from a video. This may achieve a real-time traffic sign recognition, for example, for a video of 20 frames per second with an image resolution of 1080×1920 pixels.

According to various embodiments, the traffic sign recognition speed up method is based on the inter-frame sign relevance in a video. Instead of searching the possible sign candidates in the whole image frame, a randomly generated sub-window may be used as the new search window for sign detection in each frame. Once the traffic sign is found in a sub-window and the region-of-interest (RoI) will be locked. Based on the determined RoI in the current frame, a new RoI can be derived in the next frame. While performing sliding window detection in the RoI window, the number of sliding windows can be reduced by using the detected sign information in the previous frame, to perform faster traffic sign detection. The random search window and refined sliding window strategy as illustrated in FIG. 5 and FIG. 6 below greatly speeds up the traffic sign detection time without performance sacrifice.

According to the random search window generation method, when there is no sign detected in the current video frame, a sub-window is randomly selected in the current frame as the search window to perform sign detection. If there is no detection, the sub-window is removed in the next frame and another new sub-window whose position is different from the previous sub-window is randomly generated. If a detection exists, the position of the detected sign is locked and used to extend this sub-window to a larger range in the next frame and check whether any other signs exist in the next frame.

Figure 5:
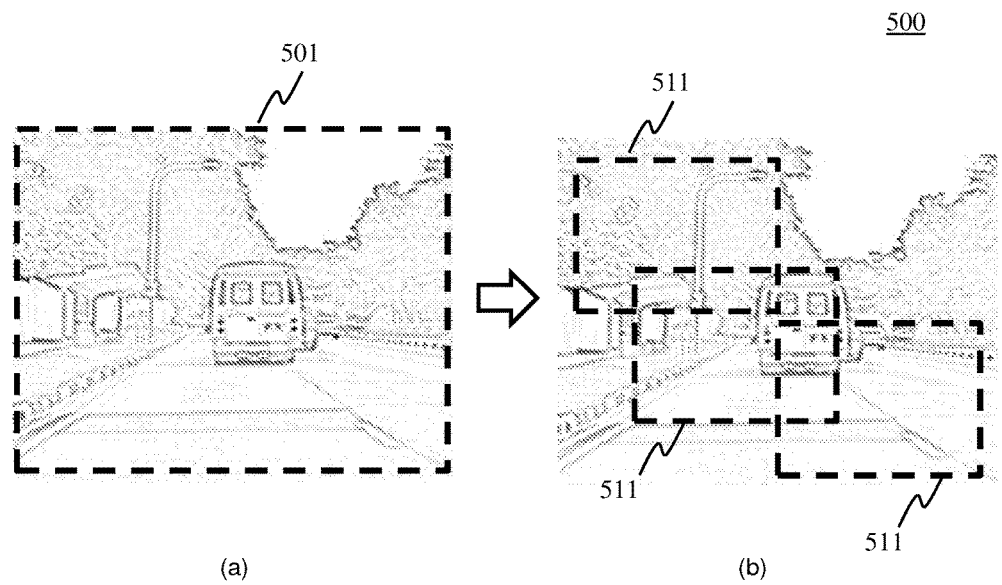
FIG. 5 shows randomly generated search windows according to various embodiments.
Figure 6:
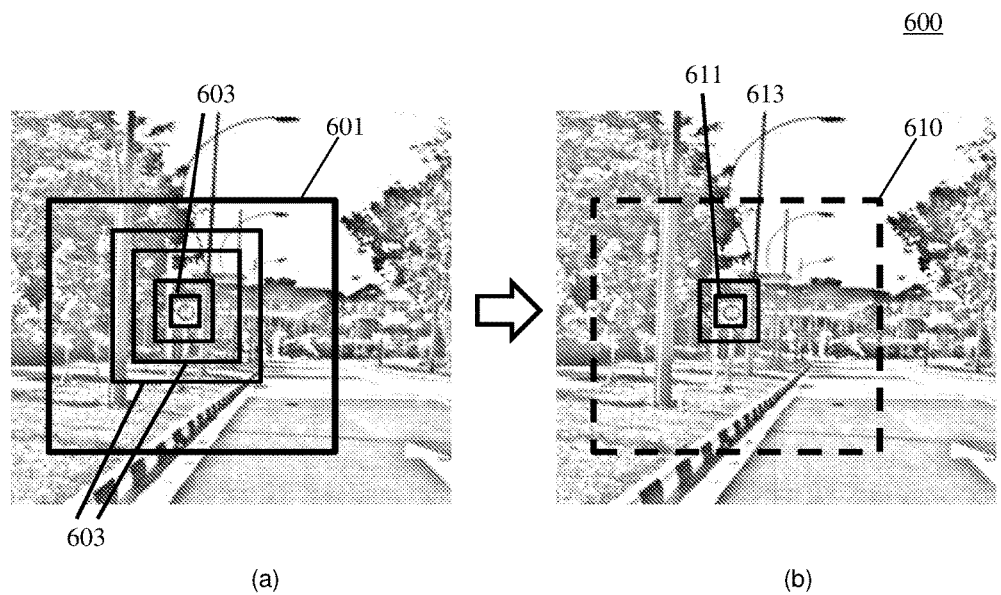
FIG. 6 shows refined sliding windows according to various embodiments.

FIG. 5 shows an illustration 500 of randomly generated sliding windows according to various embodiments. In FIG. 5(*a*), an original search window 501 is shown, which is very large. In FIG. 5(*b*), randomly selected sub-windows 511 according to various embodiments are shown, which are smaller and speed up the detection process.

In the sliding window search process, the sliding window size is usually changed from small to large values to be matched with the actual sign size. If a sign is detected in the previous frame and its size is also confirmed, it is not necessary to use all possible sizes of sliding windows to perform sign search in the next frame. According to various embodiments, a smaller number of sliding window sizes is selected to match with the possible signs in the next video frame. For instance, if the sign size is s in the previous frame, sliding window sizes from s to a size larger than s (for example, 1.25s, 1.5s, 2s, 2.5s, etc.) are selected for traffic sign detection, while sub-windows with bigger sizes are not necessary. In this manner, the sliding window search scale space is greatly reduced and the detection process is also speeded up.

FIG. 6 shows an illustration 600 of refined sliding windows according to various embodiments. FIG. 6(*a*) shows a conventional approach, in which a plurality of original sliding windows 603 of multiple sizes is shown. The large number of sliding windows 603 in a search window 601 generated in the previous frame is used in the traffic sign search process, which is time-consuming. FIG. 6(*b*) shows a speed up approach according to various embodiments, in which a smaller number of sliding windows are used. In this embodiment, a first sliding window 611 of size s and a second sliding window 613 of size 2s are generated based on the detected sign size s in the previous frame. It is understood that other number of sliding windows of different sizes may be generated in other embodiments. The image frame may be scanned using the sliding windows 611, 613 in a search window 610 generated in the previous frame. The reduced number of sliding windows and the reduced sizes of the sliding windows 611, 613 as compared to the sliding windows 603 of FIG. 6(*a*), help to speed up the traffic sign searching and detection process.

Various embodiments provide a device for recognizing a traffic sign from a video, according to the method described in various embodiments of FIGS. 4-6 above. The traffic sign recognition device may include various circuits for recognizing a first traffic sign from a first input image of the video according to the method of FIGS. 1-3 above. The traffic sign recognition device may further include a sliding window generator for determining a first size of the first traffic sign in the first input image and determining one or more sliding windows with one or more sizes from the first size to a second size larger than the first size. The traffic sign recognition device may further include a scanning circuit for scanning a subsequent input image of the video using the one or more sliding windows to recognize a second traffic sign in the subsequent input image.

Various embodiments of the traffic sign recognition method described in FIGS. 4-6 are analogously valid for the traffic sign recognition device, and vice versa.

Various embodiments of the method in FIGS. 1-6 above are described for traffic sign recognition, but it is understood that they may also be used for other object recognition.

Figure 7:
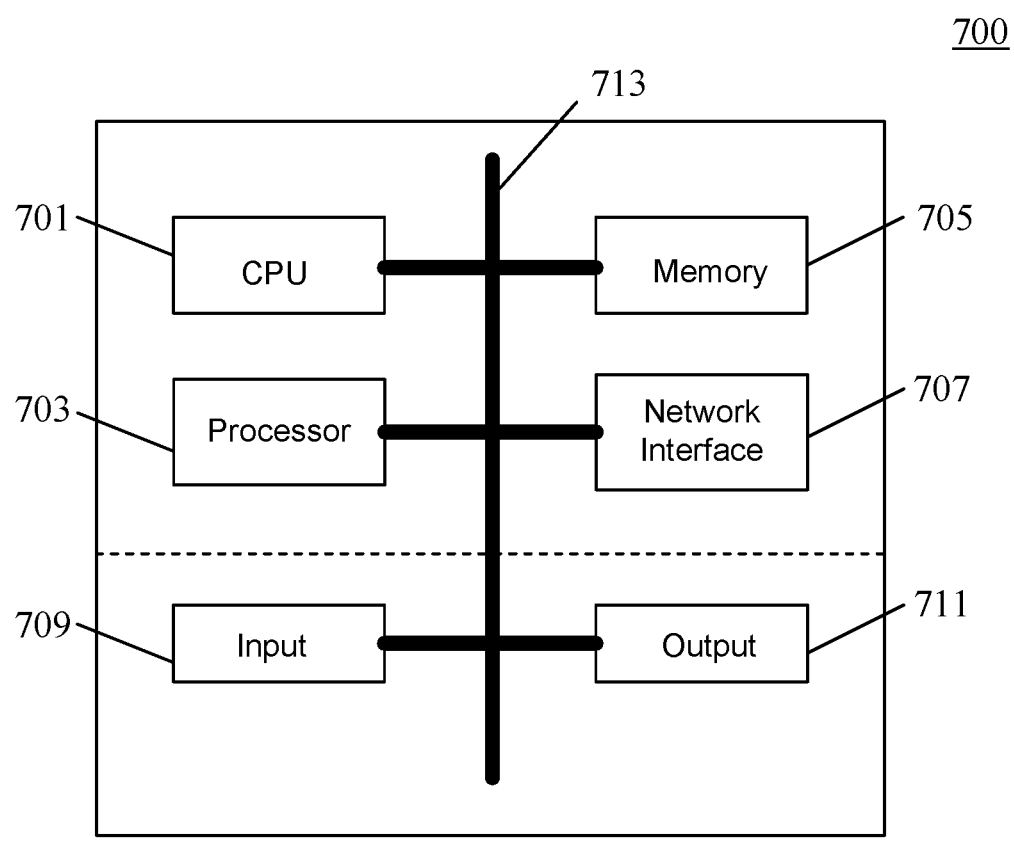
FIG. 7 shows a schematic diagram of a device for traffic sign recognition according to various embodiments.

FIG. 7 shows a schematic diagram of a device for traffic sign recognition according to various embodiments.

The device 700, also referred to as a traffic sign recognition device 700, may be implemented by a computer system, and may be used to carry out the traffic sign recognition method of FIGS. 1-6 above. In various embodiments, the image feature extracting circuit, the image feature modifying circuit, the traffic sign candidate determining circuit, the confidence score determining circuit, the traffic sign recognizing circuit of the traffic sign recognition device 700 may also be implemented as modules executing on one or more computer systems.

The computer system may include a CPU 701 (central processing unit), a processor 703, a memory 705, a network interface 707, input interface/devices 709 and output interface/devices 711. All the components 701, 703, 705, 707, 709, 711 of the computer system 700 are connected and communicating with each other through a computer bus 713.

The memory 705 may be used for storing various images, image features, modified features, traffic sign candidates, confidence scores that are generated or received by the traffic sign recognition device 700 according to the method of the embodiments. The memory 705 may include more than one memory, such as RAM, ROM, EPROM, flash memory, hard disk, etc. wherein some of the memories are used for storing data and programs and other memories are used as working memories.

In an embodiment, the memory 705 may be configured to store instructions for the traffic sign recognition process as described in various embodiments above. The instructions, when executed by the CPU 701, may cause the CPU 701 to carry out the mobile data offload process as described in various embodiments above. The instruction may also cause the CPU 701 to store the various generated/received data according to the method of the embodiments in the memory 705.

In another embodiment, the processor 703 may be a special purpose processor for executing the instructions described above.

In various embodiments, the image feature extracting circuit, the image feature modifying circuit, the traffic sign candidate determining circuit, the confidence score determining circuit, the traffic sign recognizing circuit of the traffic sign recognition device 700 may be implemented within the CPU 701 or the processor 703, for carrying out the method of various embodiments in FIGS. 1-3. Similarly, a device carrying out the method of various embodiments in FIGS. 4-6, may further include a sliding window generator and a scanning circuit, which may also be implemented within the CPU 801 or the processor 803.

The CPU 701 or the processor 703 may be connected to a network through the network interface 707. In an embodiment, the CPU 701 or the processor 703 may be connected to an internal network (e.g. a local area network (LAN) or a wide area network (WAN) within an organization) and/or an external network (e.g. the Internet) through the network interface 307, for example, to recognize traffic signs from images stored on a network storage device or a remote storage device.

The Input 709 may include a keyboard, a touch screen, a mouse, etc. The output 711 may include a display.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for recognizing a traffic sign from an input image, the method comprising:
    extracting image features from the input image;
    modifying the image features based on a predetermined image saliency map to determine modified image features;
    determining a plurality of traffic sign candidates by applying an adaptive boosting algorithm on the modified image features;
    determining a confidence score for each traffic sign candidate by applying a support vector regression algorithm; and
    recognizing a traffic sign based on the confidence score for each traffic sign candidate.

2. The method of claim 1, further comprising:
    determining the predetermined image saliency map based on at least one of color saliency or spatial location information of traffic signs.

3. The method of claim 2, wherein the color saliency is determined dependent on categories of traffic signs.

4. The method of claim 1, wherein the image features comprise at least one of color, gradient, orientation or shape features.

5. The method of claim 1, wherein the adaptive boosting algorithm comprises:
    a traffic sign training process using training images to learn a set of decision trees, the training images comprising traffic sign images and non-traffic sign images.

6. The method of claim 5, wherein applying the adaptive boosting algorithm on the modified image features comprises:
    applying the set of decision trees on the modified image features of the input image to determine the plurality of traffic sign candidates.

7. The method of claim 1, wherein determining the confidence score for each traffic sign candidate comprises:
    quantizing each traffic sign candidate into a bag-of-words histogram using a predefined codebook; and
    applying the support vector regression algorithm on the bag-of-words histogram to determine the confidence score for each traffic sign candidate.

8. The method of claim 1, wherein the support vector regression algorithm is trained using training samples, wherein the training samples comprises traffic sign training candidates determined by applying the adaptive boosting algorithm to training images, wherein the training samples comprise non-traffic sign regions randomly sampled from the training images.

9. The method of claim 8, wherein the support vector regression algorithm is trained based on a similarity coefficient of each training sample, wherein the similarity coefficient represents an intersection ratio between each training sample and a corresponding true traffic sign.

10. The method of claim 1, wherein recognizing the traffic sign comprises:
    recognizing that the traffic sign is present in the traffic sign candidate if the confidence score for the traffic sign candidate is higher than a predetermined score.

11. The method of claim 1, wherein recognizing the traffic sign comprises:
    recognizing that the traffic sign of a predetermined category is present in the traffic sign candidate if the confidence score for the traffic sign candidate matches a predetermined score corresponding to the predetermined category.

12. A method for recognizing a traffic sign from a video having a sequence of input images, the method comprising:
    recognizing a first traffic sign from a first input image of the video according to claim 1;
    determining a first size of the first traffic sign in the first input image;
    determining one or more sliding windows with one or more sizes, the one or more sizes are in a range from the first size to a second size larger than the first size;

scanning a subsequent input image of the video using the one or more sliding windows to recognize a second traffic sign in the subsequent input image.

13. The method of claim 12, further comprising:
   determining a position of the first traffic sign in the first input image;
   determining a search window for the subsequent input image, the search window for the subsequent input image having a position substantially similar to the position of the first traffic sign; and
   scanning the subsequent input image using the one or more sliding windows in the search window to recognize the second traffic sign.

14. The method of claim 12, further comprising:
   if no traffic sign is recognized from the first input image, randomly generating a search window for the subsequent input image with a position different from a position of a search window used for the first input image; and
   scanning the subsequent input image in the randomly generated search window to recognize the second traffic sign in the subsequent input image.

15. A device for recognizing a traffic sign from an input image, the device comprising:
   an image feature extracting circuit for extracting image features from the input image;
   an image feature modifying circuit for modifying the image features based on a predetermined image saliency map to determine modified image features;
   a traffic sign candidate determining circuit for determining a plurality of traffic sign candidates by applying an adaptive boosting algorithm on the modified image features;
   a confidence score determining circuit for determining a confidence score for each traffic sign candidate by applying a support vector regression algorithm; and
   a traffic sign recognizing circuit for recognizing a traffic sign based on the confidence score for each traffic sign candidate.

16. The device of claim 15, wherein the predetermined image saliency map is determined based on at least one of color saliency or spatial location information of traffic signs.

17. The device of claim 15, wherein the traffic sign candidate determining circuit is configured to train the adaptive boosting algorithm using training images to learn a set of decision trees, the training images comprising traffic sign images and non-traffic sign images.

18. The device of claim 17, wherein the traffic sign candidate determining circuit is configured to apply the set of decision trees on the modified image features of the input image to determine the plurality of traffic sign candidates.

19. The device of claim 15, wherein the confidence score determining circuit is configured to quantize each traffic sign candidate into a bag-of-words histogram using a predefined codebook; and apply the support vector regression algorithm on the bag-of-words histogram to determine the confidence score for each traffic sign candidate.

20. The device of claim 15, wherein the confidence score determining circuit is configured to train the support vector regression algorithm using training samples, wherein the training samples comprises traffic sign training candidates determined by applying the adaptive boosting algorithm to training images, wherein the training samples comprises non-traffic sign regions randomly sampled from the training images.

* * * * *